United States Patent
O'Neill et al.

(10) Patent No.: US 7,586,075 B1
(45) Date of Patent: Sep. 8, 2009

(54) METHOD FOR ANALYZING OUTPUT DATA OF ARRAY SUBELEMENTS OF AN IMAGING SEGMENTED ARRAY

(75) Inventors: Mary Morabito O'Neill, Santa Barbara, CA (US); Gregory K. Pierce, Santa Barbara, CA (US); William H. Wellman, Santa Barbara, CA (US)

(73) Assignee: Raytheon Company, Waltham, MA (US)

(*) Notice: Subject to any disclaimer, the term of this patent is extended or adjusted under 35 U.S.C. 154(b) by 854 days.

(21) Appl. No.: 10/790,894

(22) Filed: Mar. 1, 2004

(51) Int. Cl.
*H01L 27/00* (2006.01)
(52) U.S. Cl. .................. 250/208.1; 250/203.6
(58) Field of Classification Search .............. 250/208.1; 348/274–275, 315
See application file for complete search history.

(56) References Cited

U.S. PATENT DOCUMENTS

| | | | | |
|---|---|---|---|---|
| 4,796,187 A | 1/1989 | North | | 364/423 |
| 4,868,871 A | 9/1989 | Watson, III | | 382/1 |
| 4,910,401 A | 3/1990 | Woods | | 250/332 |
| 4,950,881 A * | 8/1990 | Kaltschmidt | | 250/203.6 |
| 5,023,921 A | 6/1991 | Goutte et al. | | 382/58 |
| 5,075,553 A | 12/1991 | Noble et al. | | 250/352 |
| 5,499,098 A * | 3/1996 | Ogawa | | 356/621 |
| 5,878,163 A | 3/1999 | Stephan et al. | | 382/172 |
| 5,956,087 A * | 9/1999 | Takayama et al. | | 348/275 |
| 6,252,996 B1 * | 6/2001 | Putnam | | 382/259 |
| 6,259,111 B1 * | 7/2001 | Tullis | | 250/559.32 |
| 6,259,826 B1 * | 7/2001 | Pollard et al. | | 382/284 |
| 6,311,895 B1 * | 11/2001 | Olmstead et al. | | 235/462.41 |
| 6,320,173 B1 * | 11/2001 | Vock et al. | | 250/206.1 |
| 6,507,011 B2 * | 1/2003 | Ang | | 250/208.1 |
| 6,522,356 B1 * | 2/2003 | Watanabe | | 348/272 |
| 6,563,101 B1 * | 5/2003 | Tullis | | 250/208.1 |
| 6,654,056 B1 * | 11/2003 | Perregaux et al. | | 348/275 |
| 2002/0113196 A1 * | 8/2002 | Hou | | 250/208.1 |

\* cited by examiner

*Primary Examiner*—Georgia Y Epps
*Assistant Examiner*—Kevin Wyatt
(74) *Attorney, Agent, or Firm*—Leonard A. Alkov (57) ABSTRACT

A position of a feature in a scene is located by forming an image of the feature using a segmented array having a plurality of array subelements. Each of the array subelements has an output signal. The output signals from at least two spatially adjacent array subelements are cooperatively analyzed to establish a data set reflective of an extent to which output signals responsive to the image of the feature are produced from exactly one or from more than one of the adjacent array subelements. The data set is used to reach a conclusion as to a location of the image of the feature on the segmented array. Increased positional accuracy is attained with no loss of sensitivity.

24 Claims, 4 Drawing Sheets

METHOD FOR ANALYZING OUTPUT DATA OF ARRAY SUBELEMENTS OF AN IMAGING SEGMENTED ARRAY

This invention relates generally to the analysis of the output data of an imaging segmented array and, more particularly, to the analysis of the output data of a segmented light-detector array.

BACKGROUND OF THE INVENTION

Tracking systems commonly determine the position of an object by analyzing its image with a segmented detector having a multiplicity of array subelements that are approximately equal in size and shape. Optical systems typically form an image on a spectrally selective semiconductor array of subelements, in either the visible, infrared, or ultraviolet spectral ranges. The high resolution of optical systems enables the precise setting of detector subelement size, shape, and placement. Most commonly, square detector subelements are used in such systems, although other symmetric shapes, such as mosaics of regular hexagons, have been used in detector arrays. Non-optical systems can use the same imaging principles. Radar systems form an image by antenna beam patterns, and the detector is a frequency-selective receiver. Acoustic systems form an image on a sound-selective sensor.

In each case, the image is divided among multiple detector array subelements, either by simultaneously sensing on a fixed detector array, or by sequentially sensing as the scene is moved over the detector. This image motion can be imparted by physical motion of the scene, the entire sensor, the detector, the imaging means, or other sensor-internal mechanism. The image division among multiple subelements also can be imparted with no physical motion, by electronic processing that subdivides a scene image, or by electronic scanning that moves sub-images across a large scene image.

In one common approach, where the image is not much larger than a detector subelement, the location of an object is determined relative to the detector centerline by analyzing the difference in signal between adjacent subelements. This can be done in one dimension, with two array subelements adjacent in a side-by-side relation. The "left-right" position is the simple difference of the signal from the "left" subelement minus the signal from the "right" subelement. Usually this difference signal is normalized by dividing by the sum of the "left" and "right" signals, in order to give a position indication that does not vary with signal strength. This same principle may be applied in two dimensions, using four detector subelements in a symmetrical quadrant array, with the subelements pair-wise differenced. For example, "up-down" signals are generated by the difference between the sums of the signals from the two "upper" subelements, minus the sum of the signals from the two "lower" subelements. Such techniques are common in monopulse radar sensors that are used for missile guidance and other applications. These techniques are also used in optical trackers and acoustic sensors. Such location signals are often used by a tracking mechanism, to set the aim point at this centerline location.

In another common approach, where the image covers several array subelements, the center or centroid of the image is determined. This approach is most common in optical systems, which typically use large arrays of detector subelements to create a scene image. The location determination then is made by locating the center or centroid within this array. This approach determines the position over a wider range of displacements than is possible with only two or four detector subelements, yet maintains the same positional accuracy.

The accuracy of the determination of the location of the feature is a crucial concern in such sensors. The spatial location of the image on the detector array may be translated geometrically into an angle of the feature relative to a reference axis of the sensor, such as the boresight of the platform that carries the sensor.

An important unsolved problem is that there may be substantial positional ambiguity in determining the image location on the array of subelements, which translates into a substantial angular ambiguity in determining the location of the feature that produces the image. There is an ongoing need for an improved approach for segmented-array detectors to achieve increased accuracy in the determination of the location of the image of the feature without sacrificing sensitivity. The present invention fulfills this need, and further provides related advantages.

SUMMARY OF THE INVENTION

The present invention provides a method for analyzing the output signals of the subelements of the detector array that results in increased positional accuracy of the determination of the image location, without added hardware cost. The sensitivity of the detector array is not compromised. This approach may be used with imaging segmented-array sensors using any type of radiation, including light, acoustic, and radio frequency radiation. The present approach is compatible with other known sensor technologies such as the use of filters placed between the scene and the detector array, so that a wide range of spectral bands may be viewed. No changes to the optics system are required to achieve the improved accuracy determination.

In accordance with the invention, a method for locating a position of a feature in a scene comprises the steps of forming an image of the feature using a segmented array having a plurality of array subelements, wherein each of the array subelements has an output signal, and cooperatively analyzing the output signals from at least two spatially adjacent array subelements. The cooperative analysis is performed to establish a data set reflective of an extent to which output signals responsive to the image of the feature are produced from exactly one or from more than one of the adjacent array subelements, and to reach a conclusion from the data set as to a location of the image of the feature on the segmented array.

The step of forming may include the step of providing a sensor including an optics system that forms the image of the feature of the scene at an image surface, and the segmented array at the image surface upon which the image is formed. In one application of interest, the segmented array is a segmented light-detector array having a plurality of light-detector subelements.

The sensor may be a one-dimensional segmented array formed of pairs of two adjacent array subelements, which is typically a part of a scanning sensor. The array subelements may be spatially overlapping or non-spatially overlapping. The step of cooperatively analyzing may include the steps of determining whether output signals responsive to the image of the feature are produced by one or both of the two adjacent array subelements, and identifying the location of the image of the feature responsive to the step of determining whether output signals responsive to the feature are produced by one or both of the two adjacent array subelements. The step of cooperatively analyzing may instead include the steps of determining relative strengths of output signals responsive to the feature produced by the two adjacent array subelements, and identifying the location of the image of the feature responsive to the step of determining relative strengths of output signals responsive to the feature. That is, the cooperative analysis may be based on whether output signals are produced, or the relative strengths of such output signals.

The sensor may be a two-dimensional segmented array, usually formed of a pattern of intersecting array subelements. ("Intersecting" array subelements are separate subelements that meet at an intersection line or an intersection point in the segmented array. In the cases of interest using square or rectangular array subelements, two, three, or four array subelements meet at intersection lines and points in the segmented array, depending upon whether the array subelements are staggered or not.) The step of cooperatively analyzing may include the steps of determining whether output signals responsive to the image of the feature are produced in single ones or combinations of the intersecting array subelements, and identifying the location of the image of the feature responsive to a distribution of the output signals from the step of determining whether output signals responsive to the image of the feature are produced in the intersecting array subelements. The step of cooperatively analyzing may instead include the steps of determining the relative strengths of the output signals responsive to the image of the feature that are produced in combinations of the intersecting array subelements, and identifying the location of the image of the feature responsive to the relative strengths of the output signals from the step of determining the relative strengths of the output signals responsive to the image of the feature that are produced in combinations of the intersecting array subelements. That is, as in the case of the one-dimensional segmented array, the cooperative analysis may be based on whether output signals are produced, or on the relative strengths of such output signals. In both the one-dimensional and two-dimensional cases, "whether" output signals are produced is really a subset of the "relative strengths" of the output signals, since relative strengths of 0 and 1 are the limits of the expression of "whether" output signals are produced.

In the conventional approach, the location of the image of the feature is determined by analyzing the output signal of each array subelement on its own as to the magnitude of its output signal. This approach leads to significant positional ambiguity when the image overlies two or more of the array subelements, and therefore the energy of the image is divided between the two or more array subelements. The ambiguity arises because a weak signal from a particular subelement may be a result of either a partial overlying of a strong signal of the image, or a relatively full overlaying of a weak signal of the image.

In the present approach, on the other hand, the output signals of combinations or sets of adjacent array subelements are analyzed together, reducing positional ambiguity for images that overlie two or more of the adjacent array subelements.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
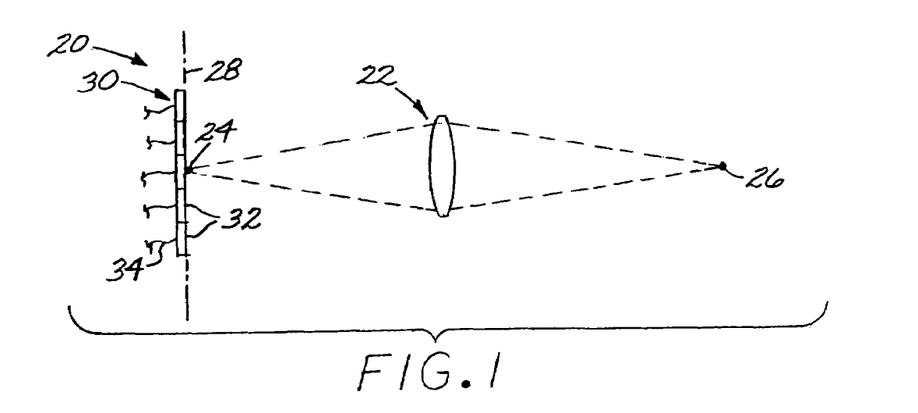
FIG. 1 is a schematic elevational view of a light sensor.

FIG. 1 depicts an imaging sensor 20, which in this case is a light-detecting sensor. The sensor includes an optics system 22, schematically indicated by a single lens element but which may include one or more lenses, mirrors, and other optical elements that form an image 24 of a feature 26 of a scene at an image surface 28. A segmented light-detector array 30 having a plurality of light-detector subelements 32 is positioned at the image surface 28. Each of the light-detector subelements 32 has an output signal 34. The present approach is applicable to the processing of the output signals 34 of such an imaging sensor 20 to form an image, for the case of the illustrated light sensor and also for other types of imaging sensors utilizing other types of energy, such as ultrasonic imaging sensors and radio-frequency imaging sensors. Standard forms of such imaging sensors are known in the art, with the exception of the modifications and improvements discussed herein. Light-imaging sensors are of the greatest current interest to the inventors, and will be used herein to illustrate the principles of the invention.

Figure 2:
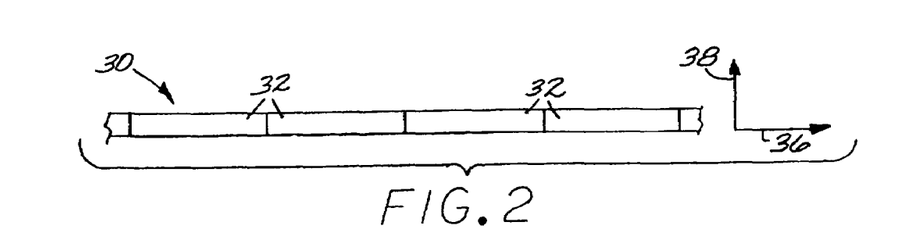
FIG. 2 is a schematic plan view of a non-overlapped one-dimensional segmented array of light-detector subelements.
Figure 3:
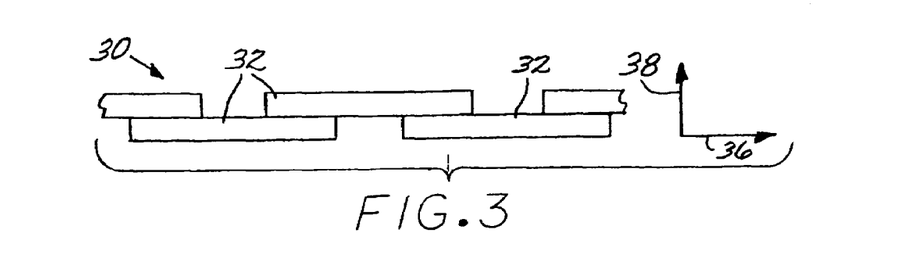
FIG. 3 is a schematic plan view of an overlapped one-dimensional segmented array of light-detector subelements.

FIGS. 2-5 illustrate some of the forms of the segmented light-detector array 30 and its light-detector subelements 32, in the view as seen looking from the feature 26 toward the image 24 in FIG. 1. FIGS. 2-3 depict one-dimensional light-detector arrays 30 wherein the light-detector subelements 32 are arranged in a linear manner parallel to a longitudinal direction 36, but have a small width in a transverse direction 38 lying perpendicular to the longitudinal direction 36. The light-detector subelements 32 are depicted as rectangular in shape, but they may have other shapes. The light-detector subelements 32 of FIG. 2 are fully one-dimensional, whereas the light-detector subelements 32 of FIG. 3 are arranged in an overlapping form that gives the light-detector array 30 a slight width in the transverse direction 38 (but is within the term "one-dimensional" as used herein). One-dimensional light-detector arrays 30 are usually scanned past a two-dimensional scene to produce a two-dimensional image of the full scene.

Figure 4:
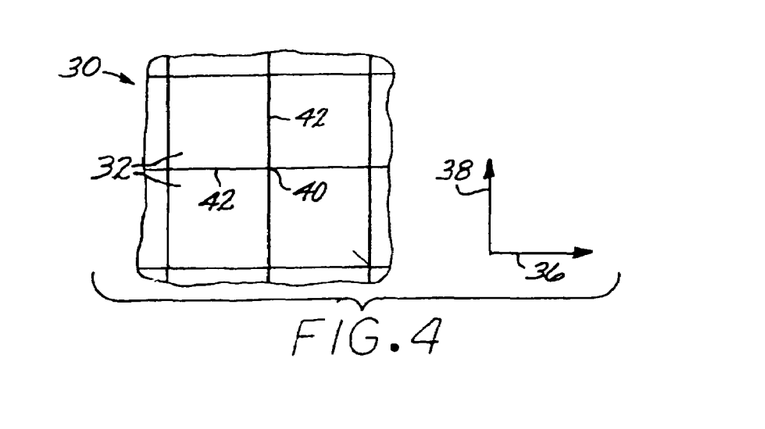
FIG. 4 is a schematic plan view of a non-staggered two-dimensional segmented array of light-detector subelements.
Figures 5, 6:
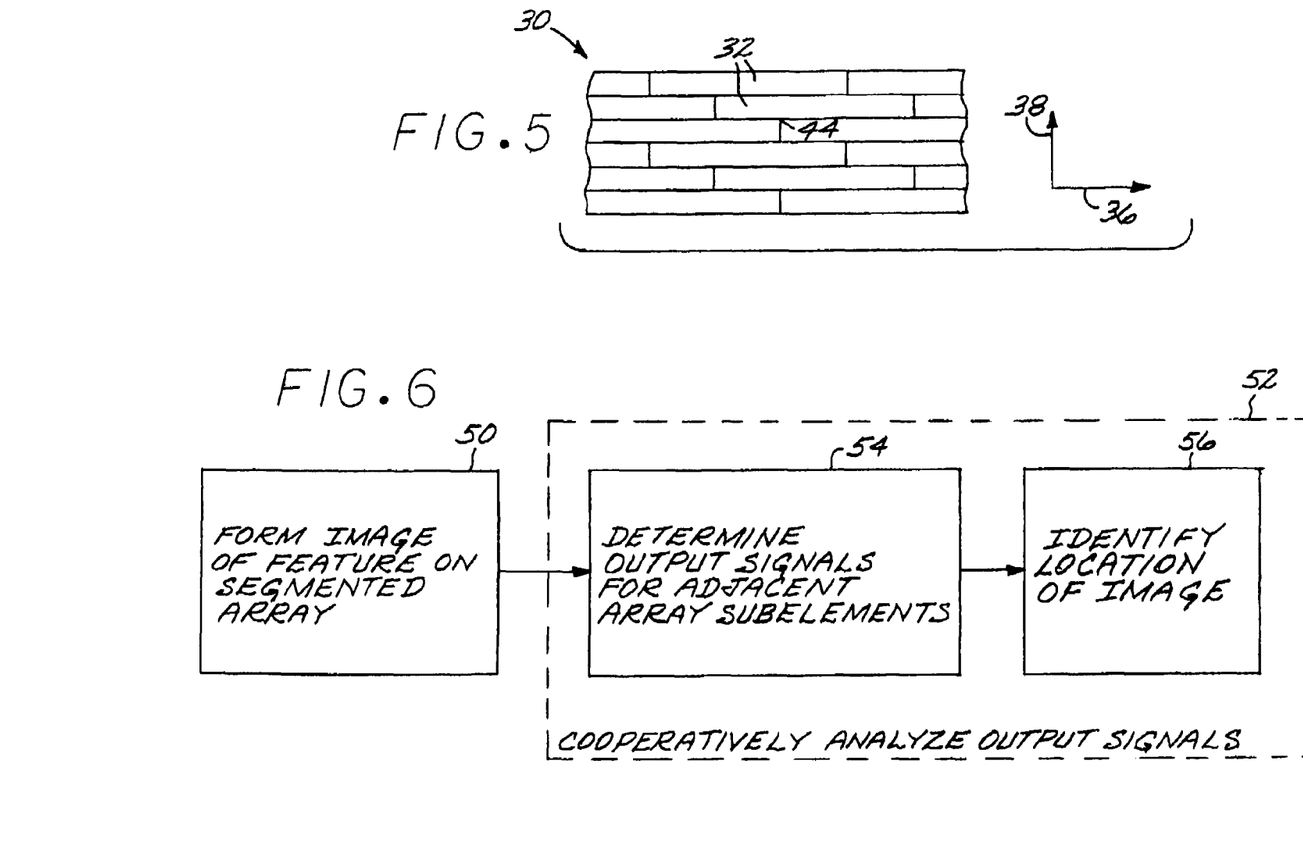
FIG. 5 is a schematic plan view of a staggered two-dimensional segmented array of light-detector subelements.
FIG. 6 is a block flow diagram of a method for practicing an embodiment of the invention.

FIGS. 4-5 depict portions of larger two-dimensional light-detector arrays 30 wherein the array of light-detector subelements 32 extends in both the longitudinal direction 36 and the transverse direction 38. The light-detector subelements 32 of FIG. 4 are depicted as square in shape (a special case of the rectangular shape), and the light-detector subelements 32 of FIG. 5 are depicted as rectangular in shape (but could be square in shape). The non-staggered light-detector subelements 32 of FIG. 4 have an intersection point 40 where four of the light-detector subelements 32 meet, while pairs of light-detector subelements 32 meet along intersection lines 42. The staggered light-detector subelements 32 of FIG. 5 have no intersection points where four light-detector subelements 32 meet, although there are intersection points 44 where exactly three of the light-detector subelements 32 meet.

The light-detector arrays 30 of FIGS. 2-5 are presented as examples of one-dimensional and two-dimensional arrays. The present approach is applicable to these illustrated arrays, as well as other forms of one-dimensional and two-dimensional arrays.

FIG. 6 depicts a method for locating a position of a feature in a scene. An image of the feature is formed, step 50, using a segmented array having a plurality of array subelements. Preferably but not necessarily, an imaging sensor 20 such as that described in relation to FIGS. 1-5 is used to form the image 24 in step 50. The output signals from at least two spatially adjacent array subelements are cooperatively analyzed, step 52. The purpose of the cooperative analysis 52 is to establish a data set reflective of an extent to which output signals responsive to the image of the feature are produced from exactly one or from more than one of the adjacent array subelements, and to reach a conclusion from the data set as to a location of the image 24 of the feature on the segmented array 30. To implement step 52, the output signals 34 for adjacent array subelements 32 are first determined, step 54, and then the location of the image 24 is identified, step 56.

Figure 7:
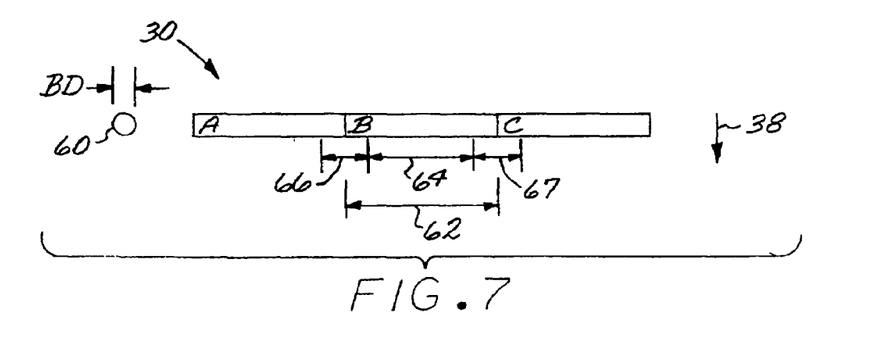
FIG. 7 is a schematic plan view of a non-overlapped one-dimensional segmented array of light-detector subelements similar to FIG. 2, with indicated ranges relevant to the present analytical approach.
Figure 8:
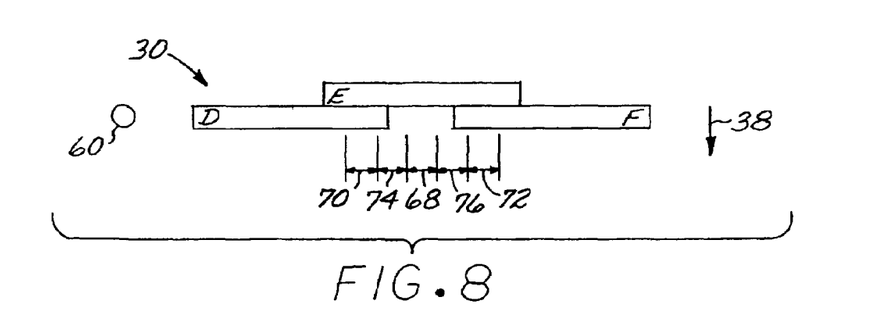
FIG. 8 is a schematic plan view of an overlapped one-dimensional segmented array of light-detector subelements similar to FIG. 3, with indicated ranges relevant to the present analytical approach.
Figure 9:
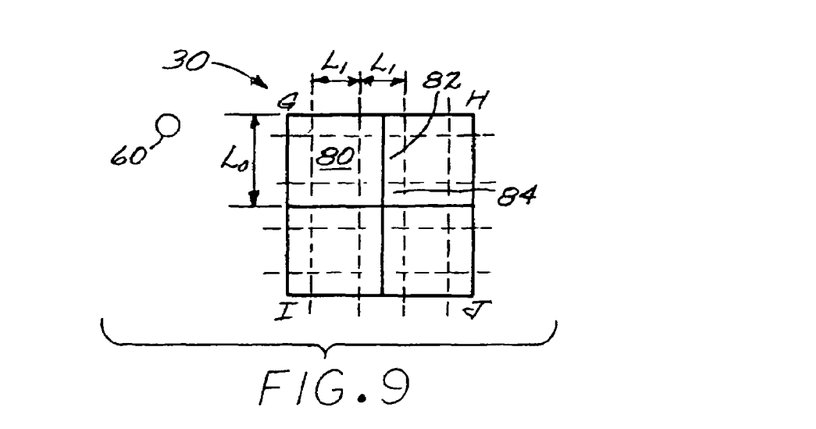
FIG. 9 is a schematic plan view of a non-staggered two-dimensional segmented array of light-detector subelements similar to FIG. 4, with indicated ranges relevant to the present analytical approach.

FIGS. 7-9 illustrate how these steps 54 and 56 are performed to achieve the cooperative analysis for three cases corresponding to FIGS. 2-4. Other cases are analyzed in a comparable manner. In each case, a blur circle 60 with a blur diameter is shown. If the imaged feature 26 is a point, its image 24 is projected as the blur circle 60 at the image surface 28 due to diffraction and aberration effects of the optics system 22. The diameter of the blur-circle image at the image surface of the point at infinity is termed the "blur diameter" BD, which is a characteristic of the optics system 22.

FIG. 7 illustrates a non-overlapping segmented light-detector array 30 that is scanned in the transverse direction 38. The segmented light-detector array 30 has three light-detector subelements 32, indicated as A, B, and C. In a conventional analysis approach, the output of each light-detector subelement 32 is individually analyzed. If there is an output from light-detector subelement B, for example, it is judged that the image is within light-detector subelement B. That is, the image is within the range 62. With the present approach, a data set is determined as to whether there is an output signal from only light-detector subelement B, or whether there is simultaneously an output signal from both light-detector subelement B and light-detector subelement A, or whether there is simultaneously an output signal from both light-detector subelement B and light-detector subelement C. If, for example, there is an output signal from only light-detector subelement B, then it may be concluded that the image 24 is within the range 64, a smaller range than the range 62. If there is an output signal from both light-detector subelement B and light-detector subelement A, then it may be concluded that the image 24 is within the range 66, which is two blur diameters BD wide. If there is an output signal from both light-detector subelement B and light-detector subelement C, then it may be concluded that the image 24 is within the range 67, which is two blur diameters BD wide. The result of this analysis is that the location of the image may be determined more accurately in relation to the light-detector subelements than in the conventional approach. There are three analyzable ranges for each light-detector subelement, one in the center and one at each end.

Even more striking improvements in positional accuracy may be obtained from an overlapping configuration of the light-detector subelements D, E, and F, as shown in FIG. 8. In this illustrated configuration, there is a ⅓ longitudinal overlap in each pair of the light-detector subelements DE and EF. If there is a full-strength output signal from light-detector subelement E only as the segmented light-detector array 30 is scanned in the transverse direction 38, the image must be within the range 68. If there is a full-strength output signal from both light-detector subelements D and E, the image must be within the range 70. If there is a full-strength output signal from both light-detector subelements E and F, the image must be within the range 72. Further information on the location of the image may be gained by considering fractional output signals. Thus, for example, if a partial-strength output signal is obtained from light-detector subelement D and a full-strength output signal is obtained from light-detector subelement E, the image must be within the range 74. If a partial-strength output signal is obtained from light-detector subelement F and a full-strength output signal is obtained from light-detector subelement E, the image must be within the range 76. By configuring the overlapping light-detector subelements D, E, and F so that the ranges 68, 70, 72, 74, and 76 are the same lengths, the position of the image may be determined with the greatest accuracy.

Yet further accuracy of the image location may be achieved by evaluating proportional output signals in the approaches of FIGS. 7 and 8, as to the ranges where the image falls within two of the light-detector subelements. For example, in the non-overlapping case of FIG. 7, if there is a 75 percent output from light-detector subelement A and a 25 percent output from light-detector subelement B, the image must lie within the range 66 but more within light-detector subelement A than light-detector subelement B. The distinction is that in the embodiment of the analysis approach of the present invention discussed in preceding paragraphs, the determination is whether output signals responsive to the image of the feature are produced in single ones or combinations of the intersecting array subelements. In the embodiment of the analysis approach of the present invention discussed in this paragraph, the determination is the relative strengths of the output signals responsive to the image of the feature that are produced in combinations of the intersecting array subelements. The same analysis may be applied to the overlapping light-detector subelements of FIG. 8.

A visual comparison of the ranges illustrated in FIGS. 7 and 8 gives a graphic indication of the present improvement. In the conventional approach as illustrated in FIG. 7, the image location may be determined only within the range 62. In the present approach as applied to the non-overlapping light-detector subelements of FIG. 7, the determination of positional accuracy is improved so that the image by identifying its location as lying within the ranges 64, 66, or 67. But the greatest improvement in accuracy of the determination of the image location is achieved with the overlapping light-detector subelements of FIG. 8, wherein the image may be located as lying within the ranges 68, 70, 72, 74, or 76, each of which is much shorter than the conventional accuracy range 62 of FIG. 7.

The present approach is also applicable to the two-dimensional non-staggered staring array of FIG. 9, which shows four light-detector subelements G, H, I, and J of a much-larger square light-detector array 30. The light-detector subelements G, H, I, and J are each square in shape, and the four light-detector subelements meet at a common point. This pattern is repeated throughout the array. In the conventional approach, the output signals of light-detector subelements G, H, I, and J are tested individually, so that the location of the image may be determined only with the accuracy of the length $L_0$ of the side of each of light-detector subelements G, H, I, and J. With the present approach, on the other hand, the output signals of the light-detector subelements G, H, I, and J are evaluated in combinations. For example, if there is an output signal only from light-detector subelement G, then the image may be only within the range 80 at the center of light-detector subelement G. If there is an output signal from light-detector subelement G and also from light-detector subelement H (and no other light-detector subelements), then the image may be only within the range 82. If there is an output signal from light-detector subelement G and also from light-detector subelement H and also from light-detector subelement I and also from light-detector subelement J, then the image may be only within the range 84. A similar analysis applies for output signals from other light-detector subelements that intersect with light-detector subelement G (and from all other light-detector subelements in the segmented light-detector array 30). The relative-strength approach discussed above may also be applied to the two-dimensional array. Thus, for example, if light-detector subelement G has a 75 percent output signal and light-detector subelement H has a 25 percent output signal (and there are zero output signals from the other light-detector subelements), the image is within the region 82 but proportionally more in light-detector subelement G than in light-detector subelement H. If the regions 80, 82, and 84 are dimensioned equally with sides $L_1$, a comparison of $L_0$ and $L_1$ shows that the determination of position of the image is significantly more accurate with the present approach than with the conventional approach.

Figure 10:
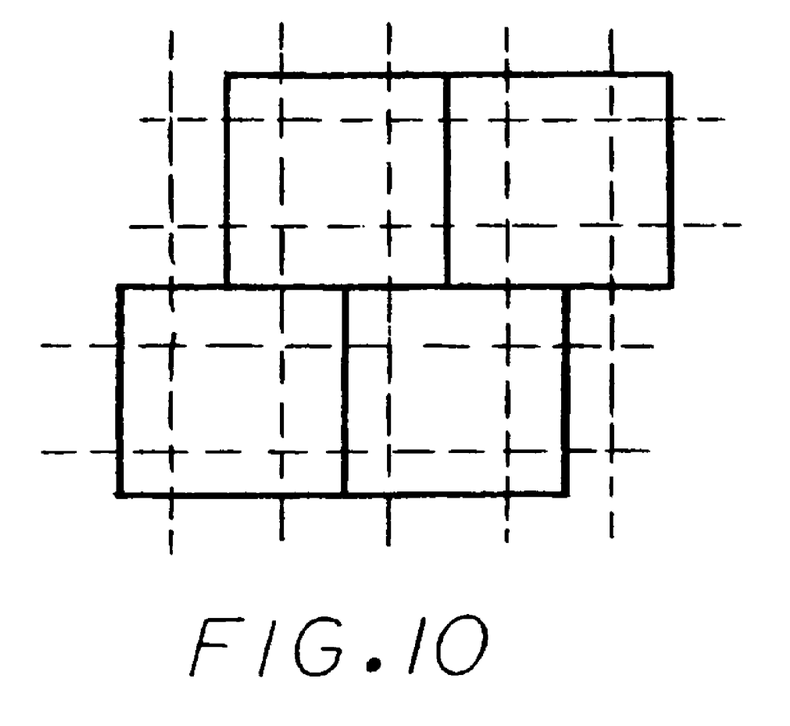
FIG. 10 is a schematic plan view of a staggered two-dimensional segmented array of light-detector subelements.

The present approach is also applicable to a two-dimensional staggered array as shown in FIG. 10, using the same principles as those discussed in relation to FIG. 9. In this case, a maximum of three subelements meet at an intersection point, and two subelements meet along intersection lines.

The discussion has assumed that the blur circle 60 has a constant intensity across its area, which is typically a reasonably good assumption. If that assumption is not met and the blur circle 60 as a position-dependent intensity, this variation in intensity may be taken into account in the computer implementation of the analytical approach discussed herein.

The present analytical approach may be applied to conventional types of segmented light-detector arrays, such as illustrated in FIGS. 2 and 4, to produce better accuracy in the determination of the location of an image that falls upon the segmented light-detector array. In these cases, the conventional configuration of the segmented light-detector array is retained, and only analysis of the output signals of the light-detector subelements is altered according to the present approach. The present approach may also be used in conjunction with new configurations of the segmented light-detector arrays designed in conjunction with the present approach, such as illustrated in FIGS. 3, 5, and 10, to produce even greater accuracy in the determination of image location than is possible with the use of the present approach as applied to the conventional segmented light-detector arrays of FIGS. 2 and 4. In all cases, the present approach is implemented in the form of a logic analysis applied to the output signals of the light-detector subelements.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for locating a position of a feature in a scene, comprising the steps of
    forming an image of the feature using a segmented array having a plurality of array subelements each having a linear dimension, wherein each of the array subelements has an output signal; and
    cooperatively analyzing the output signals from at least two spatially adjacent array subelements
        to establish a data set reflective of an extent to which output signals responsive to the image of the feature are produced from exactly one or from more than one of the adjacent array subelements, and
        to reach a conclusion from the data set as to a location of the image of the feature on the segmented array with an accuracy of less than the linear dimension of an array subelement when the output signal is produced from more than one of the adjacent array subelements.

2. The method of claim 1, wherein the step of forming includes the step of
    providing a sensor including an optics system that forms the image of the feature of the scene at an image surface, and the segmented array at the image surface upon which the image is formed.

3. The method of claim 2, wherein the step of providing a sensor includes the step of
    providing a one-dimensional segmented array formed of pairs of two adjacent array subelements.

4. The method of claim 3, wherein the step of cooperatively analyzing includes the steps of
    determining whether output signals responsive to the image of the feature are produced by one or both of the two adjacent array subelements, and
    identifying the location of the image of the feature responsive to the step of determining whether output signals responsive to the feature are produced by one or both of the two adjacent array subelements.

5. The method of claim 3, wherein the step of cooperatively analyzing includes the steps of
    determining relative strengths of output signals responsive to the feature produced by the two adjacent array subelements, and
    identifying the location of the image of the feature responsive to the step of determining relative strengths of output signals responsive to the feature.

6. The method of claim 1, wherein the step of providing a sensor includes the step of providing a one-dimensional segmented array having spatially overlapping array subelements.

7. The method of claim 1, wherein the step of providing a sensor includes the step of providing a one-dimensional segmented array having non-spatially overlapping array subelements.

8. The method of claim 1, wherein the step of providing a sensor includes the step of providing a two-dimensional segmented array.

9. The method of claim 1, wherein the step of providing a sensor includes the step of providing a two-dimensional segmented array formed of a pattern of intersecting array subelements.

10. The method of claim 9, wherein the step of cooperatively analyzing includes the steps of
   determining whether output signals responsive to the image of the feature are produced in single ones or combinations of the intersecting array subelements, and
   identifying the location of the image of the feature responsive to a distribution of the output signals from the step of determining whether output signals responsive to the image of the feature are produced in the intersecting array subelements.

11. The method of claim 9, wherein the step of cooperatively analyzing includes the steps of
   determining the relative strengths of the output signals responsive to the image of the feature that are produced in combinations of the intersecting array subelements, and
   identifying the location of the image of the feature responsive to the relative strengths of the output signals from the step of determining the relative strengths of the output signals responsive to the image of the feature that are produced in combinations of the intersecting array subelements.

12. The method of claim 1, wherein the step of providing a sensor includes the step of
   providing a two-dimensional segmented array formed of a pattern of square array subelements, wherein four of the square array subelements meet at
   an intersection point, and
   wherein the step of forming an image includes the step of
   forming the image having a diameter of one blur diameter.

13. A method for locating a position of a feature in a scene, comprising the steps of
   forming an image of the feature using a segmented light-detector array having a plurality of light-detector subelements each having a linear dimension, wherein each of the light-detector subelements has an output signal; and
   cooperatively analyzing the output signals from at least two spatially adjacent light-detector subelements
      to establish a data set reflective of an extent to which output signals responsive to the image of the feature are produced from exactly one or from more than one of the adjacent light-detector subelements, and
      to reach a conclusion from the data set as to a location of the image of the feature on the segmented light-detector array with an accuracy of less than the linear dimension of an array subelement when the output signal is produced from more than one of the adjacent array subelements.

14. The method of claim 13, wherein the step of forming includes the step of
   providing a sensor including
   an optics system that forms the image of the feature of the scene at an image surface, and
   the segmented light-detector array at the image surface upon which the image is formed.

15. The method of claim 14, wherein the step of providing a sensor includes the step of
   providing a one-dimensional segmented light-detector array formed of pairs of two adjacent light-detector subelements.

16. The method of claim 15, wherein the step of cooperatively analyzing includes the steps of
   determining whether output signals responsive to the image of the feature are produced by one or both of the two adjacent light-detector subelements, and
   identifying the location of the image of the feature responsive to the step of determining whether output signals responsive to the feature are produced by one or both of the two adjacent light-detector subelements.

17. The method of claim 15, wherein the step of cooperatively analyzing includes the steps of
   determining relative strengths of output signals responsive to the feature produced by the two adjacent light-detector subelements, and
   identifying the location of the image of the feature responsive to the step of determining relative strengths of output signals responsive to the feature.

18. The method of claim 13, wherein the step of providing a sensor includes the step of
   providing a one-dimensional segmented light-detector array having spatially overlapping light-detector subelements.

19. The method of claim 13, wherein the step of providing a sensor includes the step of
   providing a one-dimensional segmented light-detector array having non-spatially overlapping light-detector subelements.

20. The method of claim 13, wherein the step of providing a sensor includes the step of
   providing a two-dimensional segmented light-detector array.

21. The method of claim 13, wherein the step of providing a sensor includes the step of
   providing a two-dimensional segmented light-detector array formed of a pattern of intersecting light-detector subelements.

22. The method of claim 21, wherein the step of cooperatively analyzing includes the steps of
   determining whether output signals responsive to the image of the feature are produced in single ones or combinations of the intersecting light-detector subelements, and
   identifying the location of the image of the feature responsive to a distribution of the output signals from the step of determining whether output signals responsive to the image of the feature are produced in the intersecting light-detector subelements.

23. The method of claim 21, wherein the step of cooperatively analyzing includes the steps of
   determining the relative strengths of the output signals responsive to the image of the feature that are produced in combinations of the intersecting light-detector subelements, and
   identifying the location of the image of the feature responsive to the relative strengths of the output signals from the step of determining the relative strengths of the output signals responsive to the image of the feature that are produced in combinations of the intersecting light-detector subelements.

24. A method for locating a position of a feature in a scene, comprising the steps of
forming an image having a diameter of about one blur diameter of the feature using a two-dimensional segmented array having a plurality of square array subelements each having a linear dimension, wherein four of the square array subelements meet at an intersection point, and wherein each of the array subelements has an output signal; and
cooperatively analyzing the output signals from at least two spatially adjacent array subelements
to establish a data set reflective of an extent to which output signals responsive to the image of the feature are produced from exactly one or from more than one of the adjacent array subelements, and
to reach a conclusion from the data set as to a location of the image of the feature on the segmented array with an accuracy of less than the linear dimension of an array subelement when the output signal is produced from more than one of the adjacent array subelements.

* * * * *